United States Patent [19]
Mullaney

[11] Patent Number: 5,632,366
[45] Date of Patent: May 27, 1997

[54] ELECTROMAGNETIC CLUTCH WITH IMPROVED TORQUE CUSHION

[75] Inventor: Richard S. Mullaney, Franklin, Ohio

[73] Assignee: General Motors Corporation, Detroit, Mich.

[21] Appl. No.: 615,667

[22] Filed: Mar. 13, 1996

[51] Int. Cl.$^6$ ................................................ F16D 27/14
[52] U.S. Cl. ................ 192/84.1; 192/84.941; 192/209; 464/89
[58] Field of Search .............. 192/84.1, 84.94, 192/84.941, 84.93, 209; 464/89

[56] References Cited

U.S. PATENT DOCUMENTS

| | | | |
|---|---|---|---|
| 3,384,213 | 5/1968 | Bernard et al. | 192/84 |
| 4,445,606 | 5/1984 | Van Laningham | 192/106.1 |
| 4,624,354 | 11/1986 | Koitabashi | 192/84.941 |
| 5,036,964 | 8/1991 | Booth et al. | 192/84 C |
| 5,150,779 | 9/1992 | Booth | 192/84.941 X |
| 5,195,625 | 3/1993 | Chang et al. | 192/84 C |
| 5,219,273 | 6/1993 | Chang | 417/319 |
| 5,370,209 | 12/1994 | Vanlaningham et al. | 192/84.941 X |
| 5,372,228 | 12/1994 | Vanlaningham et al. | 192/84.941 |
| 5,377,799 | 1/1995 | Mullaney | 192/84 C |
| 5,390,774 | 2/1995 | Thurston et al. | 192/106.1 |

Primary Examiner—Andrea L. Pitts
Attorney, Agent, or Firm—Patrick M. Griffin

[57] ABSTRACT

An improved, torque cushioned compressor clutch supports the armature on a hard plastic molded disk, the inner edge of which closely pilots on, but is not directly attached to, a cylindrical surface of a drive shaft mounted central hub. Instead, the outer face of the disk, near the inner edge, is abutted with an axially inwardly facing shoulder, which keeps it from pulling axially off of the hub. A softer elastomer overmold adheres to both sides of the harder support disk, adhering to the hub as well, but not adhering to the interface between the disk inner edge and hub. Therefore, when the clutch engages, the disk is free to turn on the hub, at least as far as the "wind up" limit of the elastomer allows, cushioning the engagement shock. However, during operation, the close fit of the disk on the hub prevents radial whirl.

3 Claims, 6 Drawing Sheets

ELECTROMAGNETIC CLUTCH WITH IMPROVED TORQUE CUSHION

This invention relates to electromagnetic clutches for actuating automotive air conditioners in general, and specifically to such a clutch with an improved and simplified construction for a torque cushion.

BACKGROUND OF THE INVENTION

Automotive air conditioning compressors are generally not directly powered from the drive belt, but are actuated indirectly through an electromagnetic clutch, which allows the compressor to be turned on and off on demand, rather than running continually. A typical clutch includes a friction disk, which is fixed to a belt driven pulley that rotates freely on a ball bearing surrounding and coaxial to the compressor drive shaft. A central hub fixed to the drive shaft mounts an annular ferrous armature in axial opposition to the pulley so that an electromagnetic coil can pull the armature into frictional engagement with the pulley friction disk. The pulley can then transfer rotation and power to the compressor drive shaft. There are numerous existing designs for the component that mounts the armature to the hub, each of which has certain advantages and disadvantages.

It is necessary that the armature mount, of whatever construction, be axially flexible enough to allow the coil to pull the armature into and against the friction disk, but torsionally stiff enough to thereafter transfer rotation to the shaft. Some torsional resilience is desirable, however, to cushion the shock of initial disk-armature engagement, and so as to dampen torsional vibrations in operation. In the radial direction, it is best that the armature support be very stiff, so that the heavy armature will not whirl off axis about the shaft after engagement. It is also an advantage if that portion of the armature support in actual contact with the armature be insulative, so as to not interfere with the electromagnetic circuit therethrough, and it is also an advantage if it allows for a wide variety of armature designs, such as separate, concentric rings, to be easily joined thereto. That portion of the armature support directly connected to the central hub should be durable, and able to take repeated cycling and flexing without failure, since it will be highly stressed. In that regard, some fail safe mechanism to retain the armature support axially to the hub should the main connection fail is sometimes needed. It is helpful if the armature support acts as a cover, to exclude contaminants, and provides acoustic dampening. Finally, simplicity of components, and a minimal number thereof, as well as ease of manufacture and assembly, are always design goals.

Known designs fall short relative to the ideal features listed above. The most common armature support is simply multiple metal leaf springs fixed at their inner ends to the hub, and at their outer ends to the armature. The springs thus provide both a physical mount for the armature as well as the needed axial flex. Such a design is simple and durable, but wanting as to almost every other desirable feature. Separate leaf springs are radially stiff, but have little inherent torsional resilience. They are also typically steel, which is magnetically conductive, and it is difficult to use them for attaching anything but a standard, one piece armature piece to the central hub. Armatures made up of separate rings require much more complex spring designs. Leaf springs, of course, by themselves, provide no real protective cover for the from of the compressor, and are inherently noisy.

Proposed alternatives to the standard, separate leaf spring design generally involve a one piece, molded plastic or rubber disk to replace the separate metal springs. One basic design uses a thin, hard plastic disk, the inner edge of which is molded rigidly fixed to the central hub. The outer edge mounts the armature, which can be either one piece or separate rings molded into the disk. Since the disk is continuous, it inherently provides a good dust and acoustic cover. An example may be seen in U.S. Pat. No. 5,036,964 to Booth et al. Since the plastic material of the disk 45 is fairly rigid, it must be axially thin in order to have an axial flexibility comparable to a metal leaf spring. The potentially weak point of such a design is the integrally molded live hinge juncture between the plastic disk's inner edge and the hub, where all the flexing and engagement stress must be resisted and accommodated. The '964 design attempts to strengthen that juncture as much as possible by molding the inner edge into a wide, cylindrical sleeve 41, and in turn molding that sleeve around multiple lugs 42 extending out from the hub 36. Even with such a hinge, however, one embodiment provides a separate retention plate 80 to retain the disk 45 in case of structural failure. Moreover, the plastic material does not really have enough torsional flexibility to provide a good torque cushion. In fact, stiff, thin plastic disks have been found to be so impractical in terms of fatigue strength that co assigned U.S. Pat. No. 5,377,799 to Mullaney et al proposes to use a thin metal disk in a similar fashion. The metal is strong enough to flex repeatably, provides an integral return spring and dust cover, is quiet, and gives up little in terms of torsional flexibility, as compared to rigid plastics.

Given this inherent shortcoming of the more rigid plastics, it has been proposed to use more flexible, rubber like elastomer material. An example may be seen in U.S. Pat. No. 4,445,606 to Van Laningham. A bifurcated central hub having inner and outer metal sleeves has a radially thin layer of torque cushioning elastomer molded integrally between the sleeves. The outer sleeve is fixed to the drive shaft, while the outer sleeve mounts the armature through metal leaf springs. The amount of torque cushioning that is provided is limited by the radial thinness of the elastomer layer, and, of course, none of the other drawbacks inherent to separate metal leaf springs is eliminated. The more successful approach has been to use a radially wide, axially thick disk of elastomer material to directly mount the armature to the hub. This goes the farthest toward providing all the desirable features noted above. The thick layer of torsionally flexible elastomer provides good torque cushioning, replaces the separate leaf springs, dampens noise, and acts as a dust cover, and is a very simple design. An early example of such a design may be seen in co assigned U.S. Pat. No. 3,384,213 to Bernard et al, in which the elastomer cushion has a uniform axial thickness. An improvement to that basic design may be seen in co assigned U.S. Pat. No. 5,219,273 to Chang, where a unique elastomer pad with an axial thickness that decreases moving radially out is described. The pad is thick enough at the inner edge, where it is mold bonded to the outer surface of the hub, to be durable, and its resilience resists stress and fatiguing, as compared to a more rigid, molded plastic.

An inherent drawback of elastomer, however, as compared to harder plastic disks, is that the extra resilience and flexibility is inevitably reflected in an undesirable radial deformation and buckling. Other co assigned patented designs speak to that inherent problem. In U.S. Pat. No. 5,195,625 to Chang et al, cylindrical reinforcements are molded into the body of the elastomer cushion to give it added radial stiffness, which at least reduces, but doesn't eliminate, the problem. U.S. Pat. No. 5,390,774 to Thurston et al goes the farthest in eliminating radial whirl of the elastomer cushion, but does not directly stiffen it. Instead, an outer cylindrical steel ring is fixed over the outer edge of the elastomer cushion, while a guide plate welded to the central hub has a cylindrical guide flange that overlaps the outer surface of the outer steel ring. Therefore, the ring can slide axially within the guide flange as the armature and pad are pulled toward the pulley disk, but the close radial confinement of the ring within the flange effectively eliminates radial whirl in the cushion. Still, the addition of the extra ring and plate add complexity and cost, and the radial interfit of the two has to be close enough to give guidance, but not so close as to bind and retard free axial sliding. And, of course, the benefits of being able to solidly mold an armature or separate armature rings into a rigid plastic are not available when using a softer elastomer cushion.

SUMMARY OF THE INVENTION

The invention provides a clutch assembly that incorporates all the benefits of a more rigid, molded plastic armature support and a softer, more resilient torque cushion, without the typical drawbacks of either, all in an assembly with minimal components that is also simple to assemble.

Rather than following the conventional wisdom of directly fixing the armature support, or a radial guide for the armature support, to the central hub, the preferred embodiment of the invention uses a relatively thin, rigid plastic armature support disk with an inner edge that is allowed to pilot and twist freely on a cylindrical bearing surface of the central hub, but within limits. Near the outer edge the armature support disk, separate armature rings are molded concentrically into the plastic material, axially facing a conventional pulley friction disk. The support disk, in the embodiment disclosed, is not continuous. Instead, its inner edge is a separate thin ring, joined to the body of the disk by four, evenly spaced, radial spokes. The outer face of the disk inner edge is axially abutted with the face of an annular shoulder on the central hub. The hub shoulder faces axially toward the pulley disk, so that the armature support disk is prevented from moving axially off of the hub. However, the support disk is otherwise free to turn on the central hub, and is, without more, incapable of transferring torque from the pulley to the central hub.

In order to effectively fix the support disk to the hub and limit its twisting, elastomeric material is molded around and through the spokes so as to adhere thereto and to both faces of the support disk near the inner edge, and also so as to adhere to the hub bearing surface and shoulder. That portion of the hub surface directly engaged by the support disk is left free of material, however. The elastomer overmold retains the support disk and armature axially to the hub, since the inner edge is captured against the hub shoulder. The elastomer can easily flex axially as the support disk is bent inwardly about its inner edge, when the armature rings are electromagnetically pulled into the friction disk. The harder plastic of the support disk springs back solidly when the clutch is turned off. Simultaneously, as the clutch is turned on and the armature rings hit the pulley friction disk and begin to grab, the support disk inner edge and outer face can pilot freely on the hub bearing surface and shoulder face, but only within the limits of the torsional flexibility of the elastomer. The free turning allowed by the softer elastomer is sufficient to cushion the shock of engagement, and to dampen vibrations during operation. The close radial fit of the inner edge of the radially rigid support disk on the hub bearing surface keeps the armature rings and friction disk concentric, preventing radial buckling or whirl. The support disk and overmolded elastomer also provide a complete dust cover and good acoustical dampening.

Therefore, all the benefits of both a rigid plastic disk and a softer elastomer cushion are obtained. While the elastomer material has to be molded over and around the edge of the disk, this adds little cost as compared to a conventional hard plastic armature support alone, and adds no real extra steps, since the edge of the disk would otherwise itself have to be molded directly to the hub. There is no fixed live hinge to fail after repeated cycling. The elastomer is thick enough, and has enough contact area with the hub, to survive repeated cycling and, should it tear, the armature disk will still be completely axially retained to the shaft by the hub shoulder.

DESCRIPTION OF THE PREFERRED EMBODIMENT

These and other features of the subject invention will appear from the following written description, and from the following drawings, in which.

Figure 1:
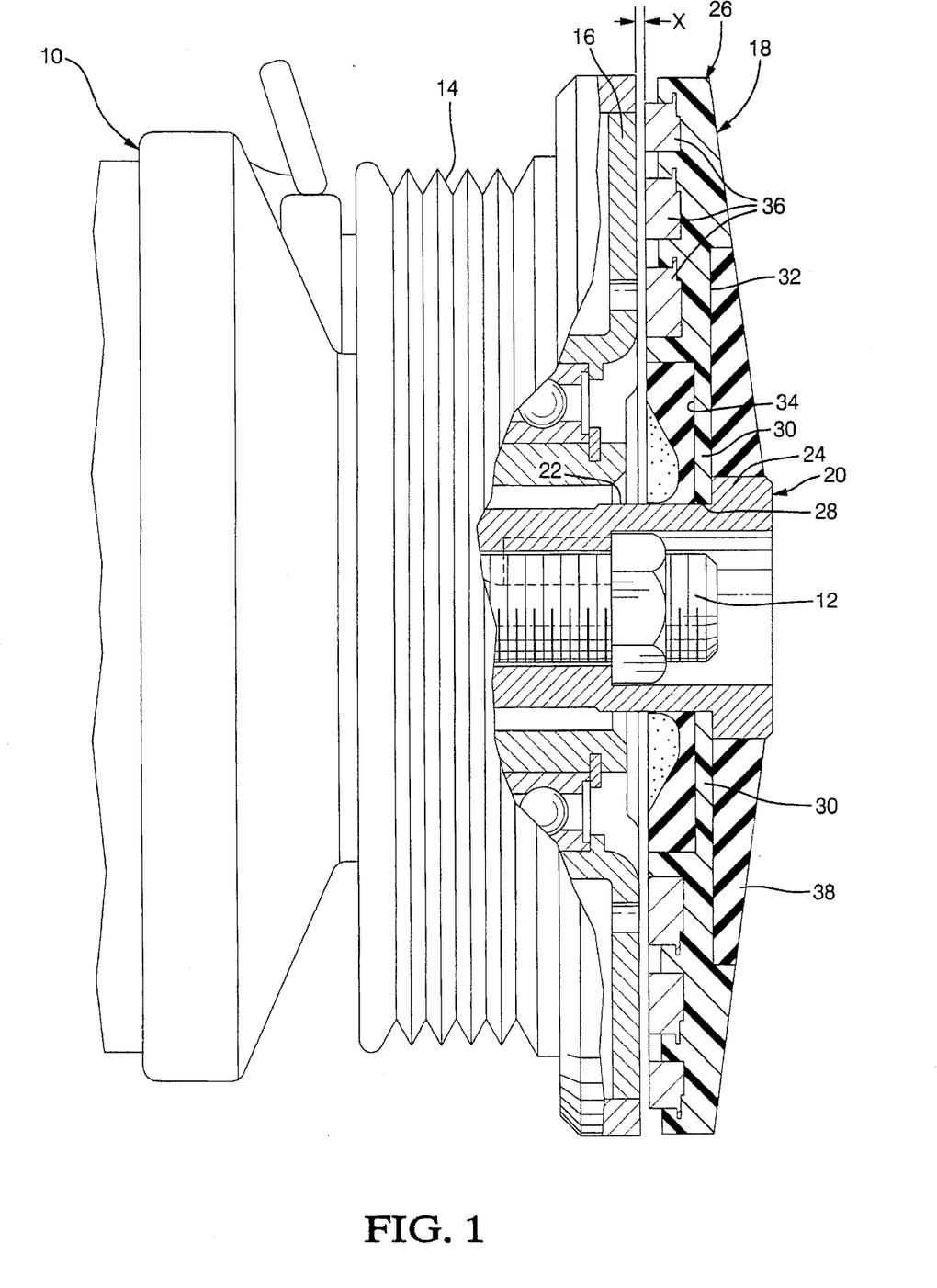
FIG. 1 a side view of a compressor, pulley and friction disk with part of the pulley broken away, and showing a preferred embodiment of the clutch assembly of the invention in cross section and in a free, unflexed state.

Referring first to FIG. 1, the invention is used in conjunction with a fluid pumping apparatus, such as an automotive air conditioning compressor, indicated generally at 10. Compressor 10 has a central drive shaft 12 about which a belt powered pulley 14 coaxially and freely rotates on a suitable bearing. A ferrous friction disk 16 is an integral part of pulley 14, and rims perpendicular and coaxial to shaft 12 as well. A conventional electromagnetic coil actuator inside of pulley 14 is capable, when energized, of creating a magnetic flux field through and in front of disk 16, so as to pull a sufficiently closely spaced, concentric ferrous ring into engagement therewith. The clutch assembly of the invention, a preferred embodiment of which is indicated generally at 18, is fixed to, and rams one to one with, drive shaft 12, and, in a de activated, free state, faces pulley disk 16 with an axial gap X small enough to be activated as described. Only when clutch assembly 18 is so activated is power and torque transmitted from pulley 14 to shaft 12 and compressor 10. Clutch assembly 18 is capable not only of transmitting power, but can also cushion the initial shock of engagement and dampen vibrations during operation, as will appear below.

Figure 2:
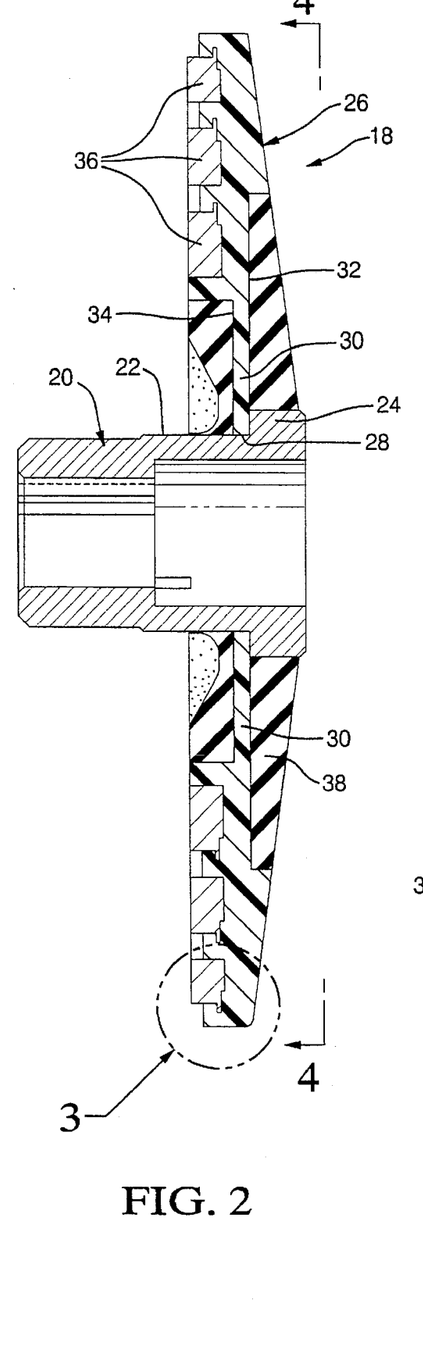
FIG. 2 a cross section through the clutch assembly alone, removed from the compressor.
Figure 3:
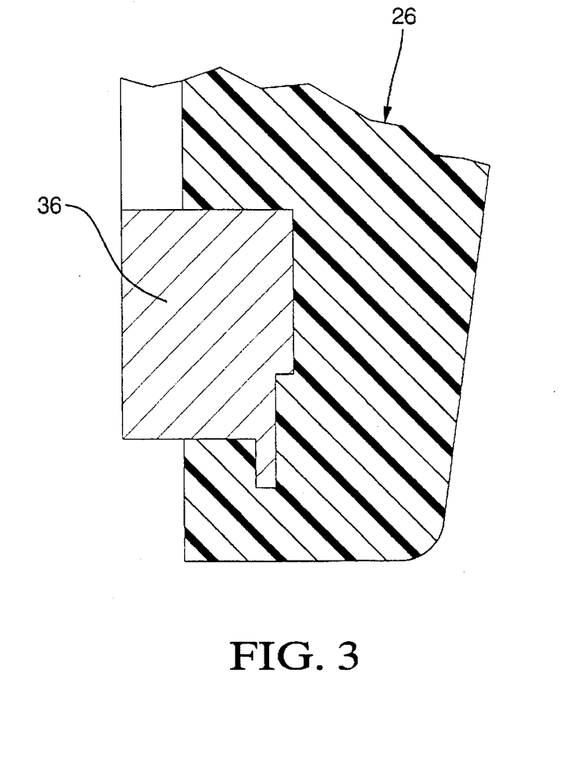
FIG. 3 enlargement of the circled portion of FIG. 2.
Figure 7:
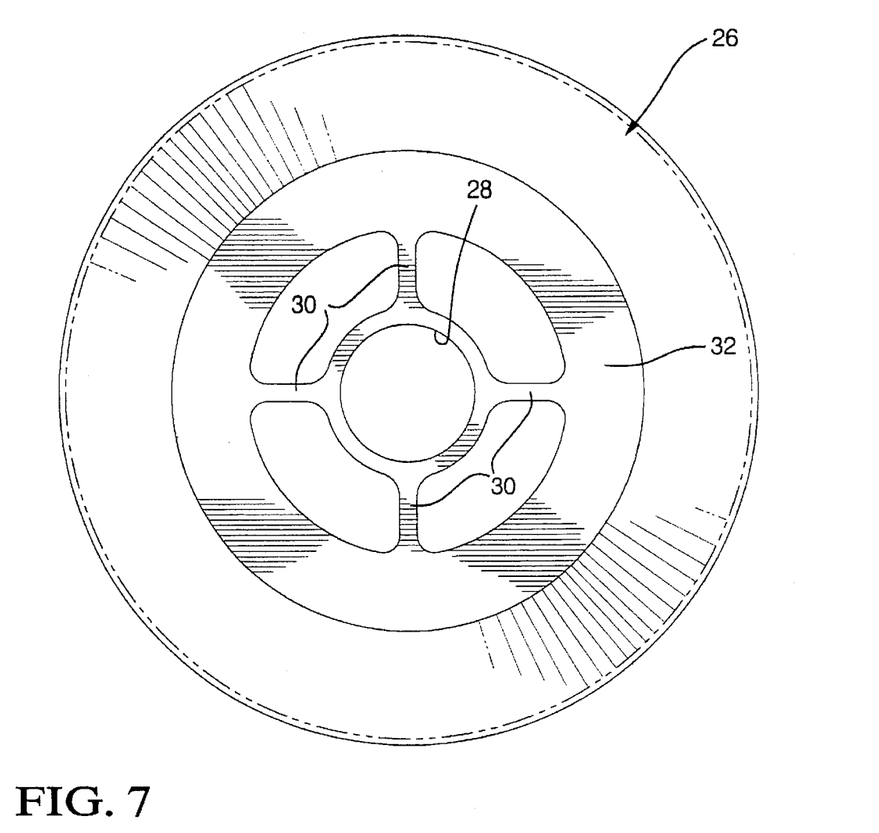
FIG. 7 is a plan view of the armature support disk alone, from the perspective of a plane through the line 7—7 of FIG. 6.

Referring next to FIGS. 2, 3 and 7, clutch assembly 18 consists of a small number of simply manufactured and assembled components. A generally cylindrical central hub, indicated generally at 20, is a machined steel part that is bolted solidly to the end of drive shaft 12, in conventional fashion. Hub 20 has a cylindrical outer bearing surface 22 and a terminal annular shoulder 24, the face of which is directed axially inwardly. The radial extent of shoulder 24 need not be great, perhaps only 10 to 25 percent of the diameter of the bearing surface 22, but the sharp corner it forms therewith, in axial opposition to the friction disk 16, provides an important and novel function. An armature support disk, indicated generally at 26, is an annular disk molded of substantially rigid plastic material, such as nylon. Support disk 26 has an outer diameter approximately equal to that of pulley 14 and an inner edge 28 that has a diameter just sufficiently larger than that of hub bearing surface 22 to make a close, slip fit thereover. As best seen in FIG. 7, support disk 26 is not a continuous, uninterrupted member. Instead, the inner edge 28 is itself a separate ting joined to the outer portion support disk 26 by four evenly spaced and relatively thin radial spokes 30. As such, disk 26 is capable of bending back and forth about the inner edge 28 much more readily than a complete, uninterrupted disk would be. The axially outer face 32 and inner face 34 of disk 26 are relieved significantly, leaving annular, concave areas that significantly thin out the spokes 30 and inner edge 28. Still, the effective radial stiffness of support disk 26 is high, since the disk 26 is radially continuous, through the spokes 30, all the way to the inner edge 28. Molded into the outer portion of disk 26 are three concentric iron armature rings 36, as seen in detail in FIG. 3, held at a diameter that places them coaxial to the pulley friction disk 16. The ability to mold in armature pieces is a unique advantage of the harder, moldable plastics, since the softer elastomers, although they are also magnetically insulative, would not hold the separate tings with sufficient rigidity. The final component of the clutch assembly is an overmold 38 of elastomer, such as nitrile rubber, which basically fills in the relieved portion of the support disk faces 32 and 34. More detail regarding the elastomer overmold 38 is given below.

Figure 4:
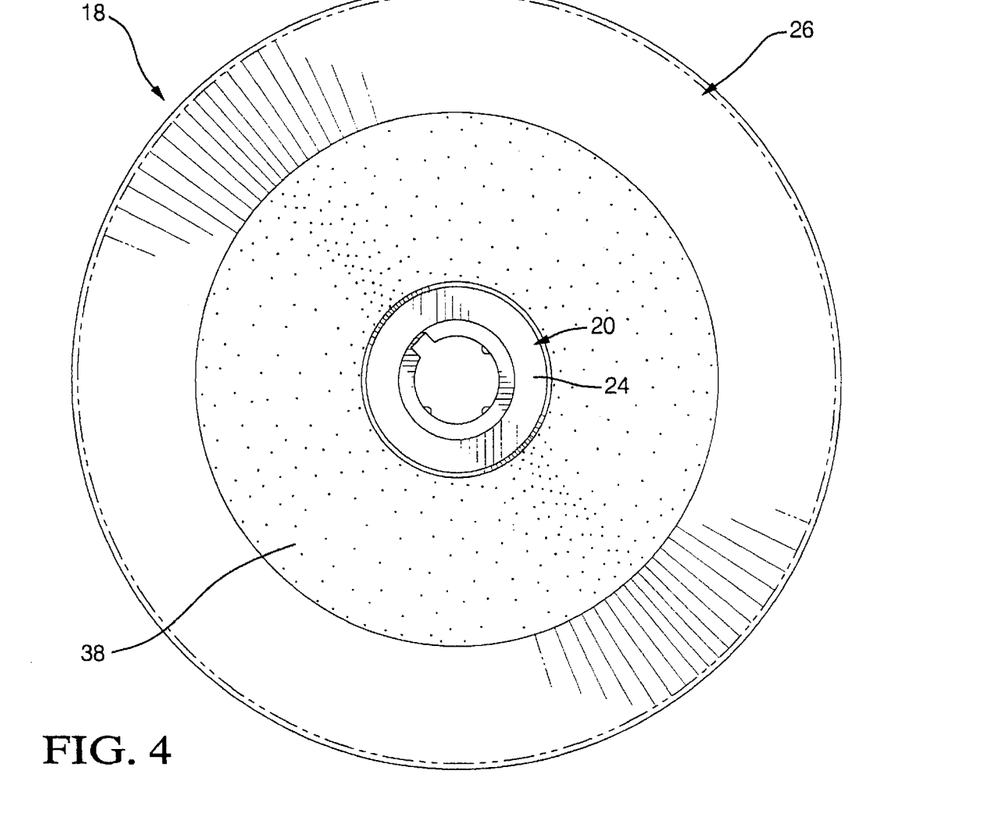
FIG. 4 a plan view of the clutch assembly, from the perspective of a plane through the line 4—4 of FIG. 2.
Figure 5:
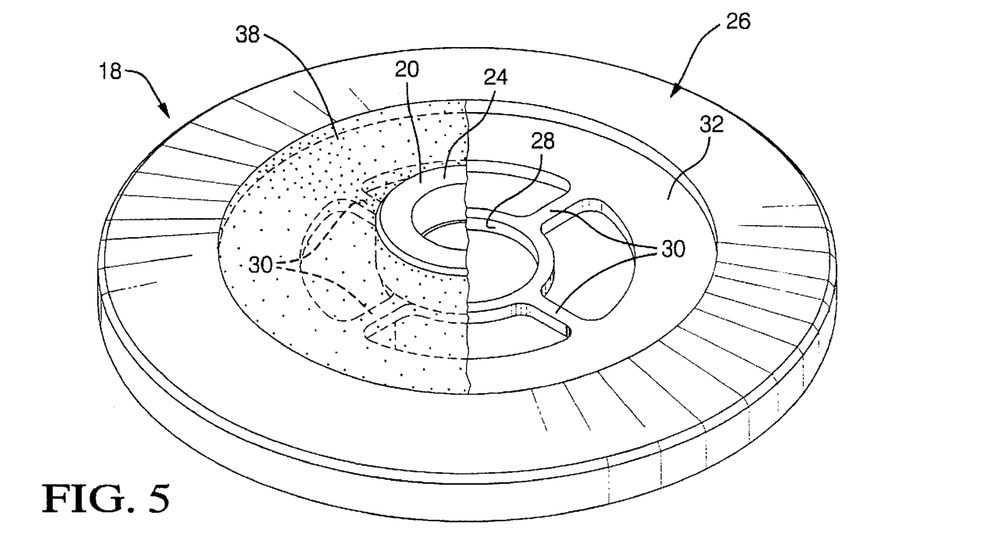
FIG. 5 a perspective view of the clutch assembly with the center portion partially broken away to reveal detail of the inner edge of the armature support disk.
Figure 6:
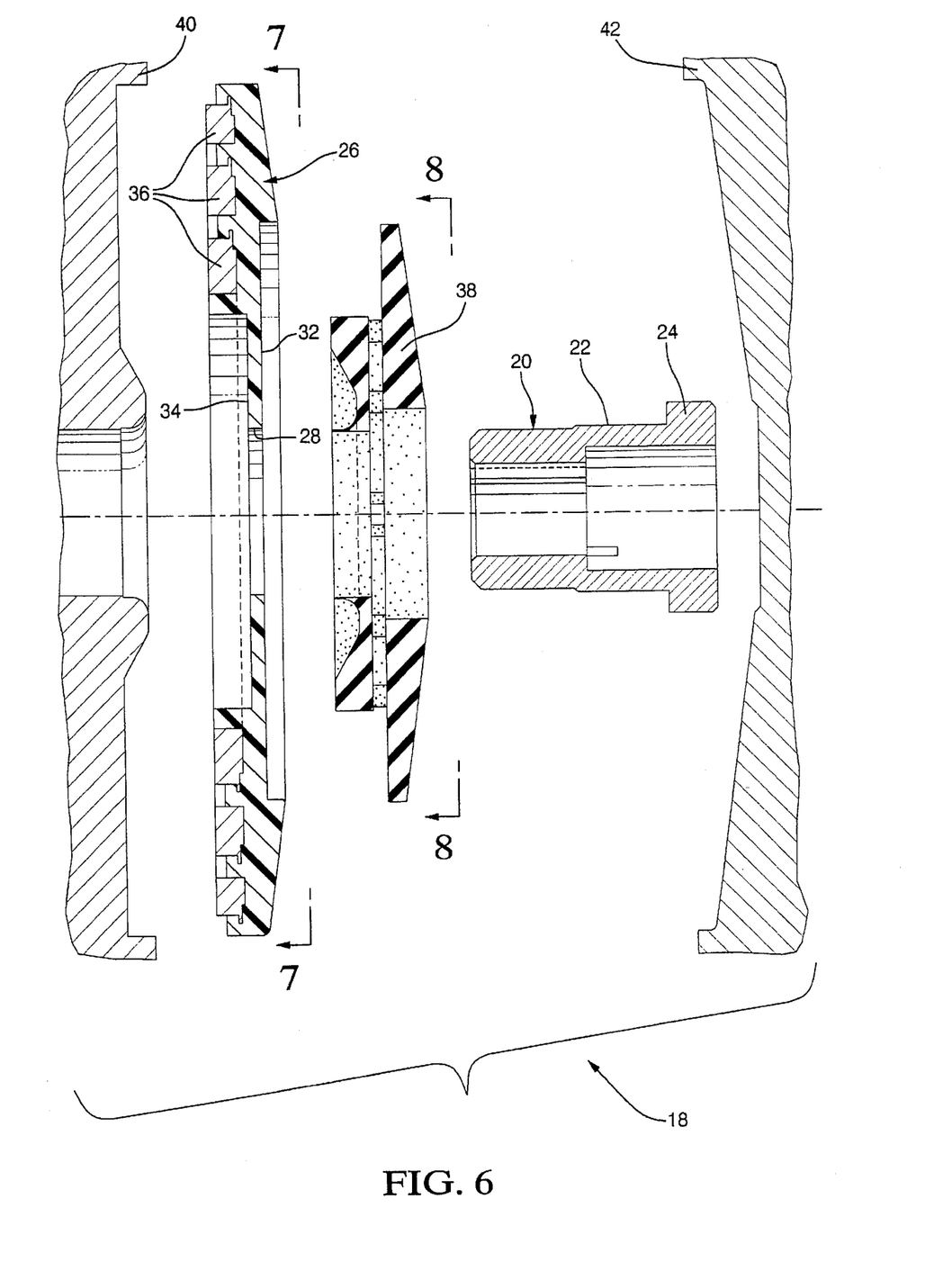
FIG. 6 is an exploded axial view of all three components of the clutch assembly in cross section.
Figure 8:
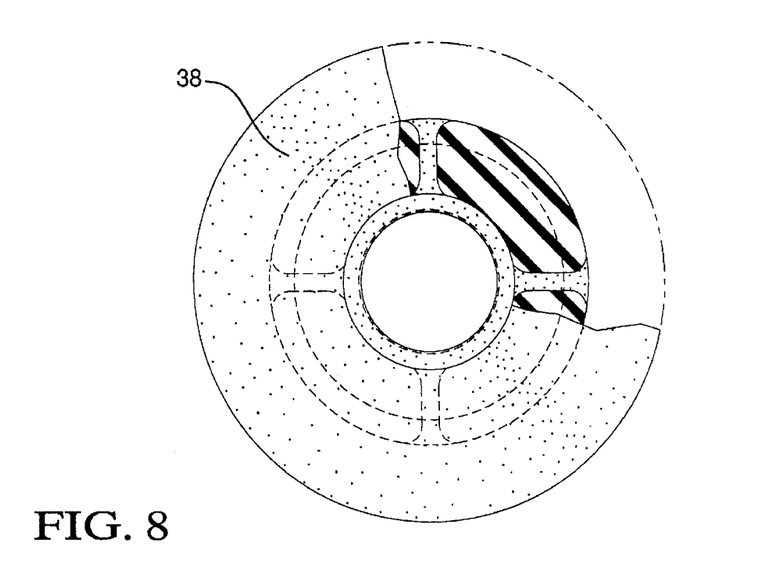
FIG. 8 is a plan view of the center portion of the support disk and elastomer overmold from the perspective of a plane through the line 8—8 of FIG. 6.

Referring next to FIGS. 4, 5, 6 and 8, details of the manufacture of clutch assembly 18 are described. The separate armature rings 36 are molded into the disk 26 first, but details of such are not given, as this is not a new use of the harder, moldable plastics per se. What is new is to apply the known advantages without the inherent drawbacks of the harder plastics, such as lack of torsional resilience and propensity to fatigue fracture. Once the armature rings 36 are molded in, the hub is slipped through the disk inner edge 28 until it abuts the shoulder 24, closely piloted on the corner formed with bearing surface 22. Then, a pair of molds 40 and 42 are clamped over the support disk 26 and hub 20 from either side. What the molds 40 and 42 accomplish is to seal against the support disk 26 and hub 20 is such a way as to form a two sided cavity in conjunction with the relieved disk faces 32 and 34. Then, the elastomer material is injected through non illustrated gates to form the overmold 38. It should be kept in mind that the overmold 38 never in fact exists as a separate piece, as is illustrated in FIG. 6. The molten elastomer flows over and around the spokes 30, as best seen in FIG. 8, and fills in and covers the previously open portions of the disk faces 32 and 34, as best seen in FIGS. 4 and 5. Elastomer material adheres to both the hub shoulder 24 and bearing surface 22, on either side of the disk inner edge 28, thereby serving to solidly axially capture the inner edge 28 against shoulder 24 and to hub 20. However, the close conformance of disk inner edge 28 to the face of shoulder 24, and to the hub bearing surface 22 just adjacent to the face of shoulder 24, keeps the elastomer from flowing into or adhering to the interface therebetween. This fact allows the clutch assembly 18 to operate in an improved fashion, as described next.

Figure 9:
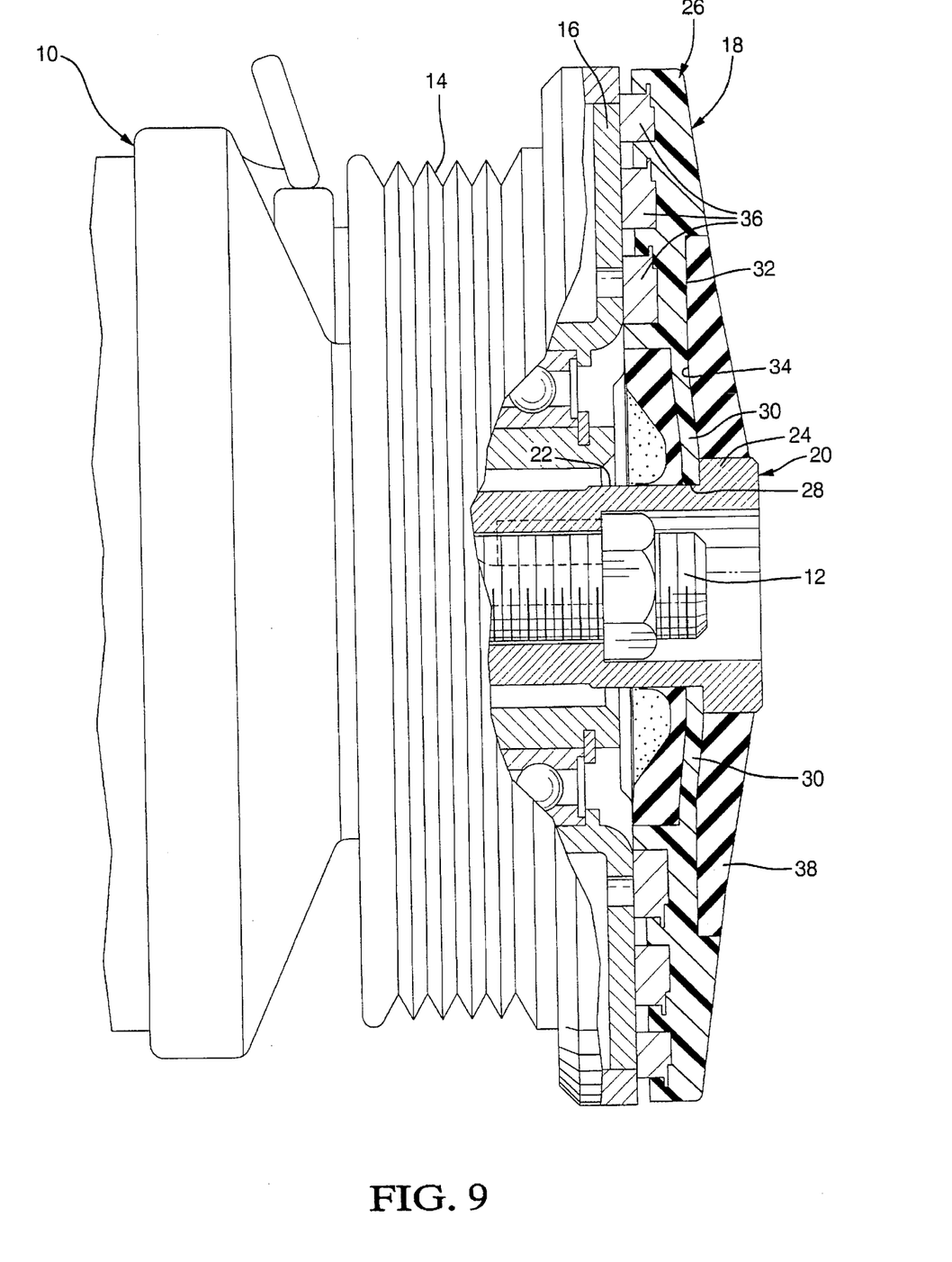
FIG. 9 a view like FIG. 1, but showing the clutch engaged, with the clutch assembly flexed and pulled axially inwardly.

Referring next to FIG. 9, when the coil is energized and the armature rings 36 are pulled toward and ultimately into engagement with the pulley disk 16, the entire support disk 26 can dish or flex inwardly about the inner edge 28, since it is held fast against the shoulder 24. In effect, the inner edge 28 bends as a live hinge would, being levered against the shoulder 24, but without being directly molded or adhered to the hub 20, as a conventional, hard plastic molded disk would be. The overmold 38, since it is molded closely around the spokes 30, reinforces them as they bend, and effectively creates a more flexible and durable hinge than a hard plastic disk alone could provide. The inner edge 28 is not subject to fatigue fracturing and breaking off of the hub 20, since it isn't directly attached thereto. Furthermore, when the armature tings 36 engage and begin to turn with the powered pulley friction disk 16, the torsional shock is cushioned well because the support disk 26 can twist relative to hub 20, as its inner edge 28 turns slightly on hub bearing surface 22. It will only until the elastomer overmold 38 "winds up" sufficiently to equal the torque seen. As it twists, however, the axial and radial position of the support disk 26 is accurately and firmly maintained, because of the close conformance of the inner edge 28 to the hub bearing surface 22 and adjacent shoulder 24. The same ability to twist slightly, and the presence of the cushioning overmold 38, allows resonant vibrations experienced during operation of compressor 10 to be absorbed and dampened. In effect, all of the positive advantages of using harder, stiffer plastic material to support the armature rings 36 (dimensional accuracy, radial stiffness, insulation) and of softer materials (torque shock cushioning, vibration absorption) are obtained, while the two materials cooperate to eliminate the disadvantages of using either of the two alone. Furthermore, since the overmold 38 fills in the holes, all of the advantages of a one piece, continuous disk are obtained, such as contaminant exclusion and acoustical shielding. When the coil is de energized, the disk 26 springs back and pulls the armature rings 36 away, and any shock of disengagement is similarly cushioned.

Variations in the disclosed embodiment could be made. The support disk 26 could be formed from a resilient metal, or some other suitable material. The moldable, rigid plastic is desired because of its moldable and insulative properties, but other materials could provide the same radial rigidity and axial flexibility. Any stop member on the end of hub 20 that faced axially inwardly, such as a threaded on nut, or a cross pin, or a series of spaced lugs, could serve as an anchor or fulcrum about which the disk 26 could bend. The continuous, integral annular shoulder 24 is easy to machine, however, and it's face provides a good sliding surface. The support disk inner edge 28 could be axially captured between two rigid surfaces, such as an outer integral shoulder and a threaded on ring that was axially spaced from the shoulder. This would still allow the disk 26 to twist, would not jeopardize the ease of assembly of the disk 26 to the hub 20, and the overmold 38 could still be added in the same way. However, it is not necessary to fix the axially inner limit of the disk 26 so solidly, only the axially outer limit, which shoulder 24 does. The disk inner edge 28 could be simply the edge of a central hole through an otherwise complete disk surface, without the discontinuous spokes 30. This would axially stiffen the disk 26, allowing it to be made thinner, if desired. However, the overmold would then have to be injected from both sides of the disk 26 in order to reach both faces 32 and 34. The faces 32 and 34 would not necessarily have to be relieved, as shown, in order to provide room for the overmold 38, as the cavities therefor could be built into the molds 40 and 42. However, the outer portion of the disk 26 will generally have to be thick in order to accommodate the armature rings 36, thicker than the inner edge 28 which, if equally thick, would likely not be axially flexible enough. Therefore, it is doubly advantageous to relieve the faces 32 and 34 near the inner edge 28. Therefore, it will be understood that it is not intended to limit the invention to just the embodiment disclosed.

I claim:

1. An electromagnetic clutch assembly in combination with a fluid pumping apparatus having a central drive shaft and a powered rotor supported for free rotation about said drive shaft, said powered rotor having a generally annular friction disk coaxial to said drive shaft and facing in one axial direction relative to said pumping apparatus, said clutch assembly comprising, a central hub fixed to said drive shaft having a cylindrical bearing surface coaxial to said drive shaft, a stop member fixed to said central hub adjacent said bearing surface and facing in axially the opposite direction from, and radially and axially spaced relative to, said friction disk, a generally annular armature support disk comprised of a material that is radially and torsionally stiff, but axially flexible, said armature support having a radially inner edge sized to fit radially closely over said hub bearing surface axially between said hub stop member and said friction disk, said armature support having an outer face facing away from said friction disk and in axial abutment with said hub stop member and an oppositely directed inner face, a generally annular armature fixed to said armature support and axially spaced from said friction disk by a predetermined gap when said armature support is in an unflexed state and frictionally engageable with said friction disk when pulled electromagnetically theretoward, and, a torsionally flexible, resilient elastomeric material molded to both faces of said armature support disk inner edge and to said central hub so as to axially capture said armature support inner edge in abutment with said central hub stop member while allowing free rotation of said armature support disk inner edge upon said central hub bearing surface within the limits of said elastomeric material's torsional flexibility, whereby, when said armature is pulled axially into engagement with said friction disk, said armature support disk may flex inwardly about said axially captured inner edge while, simultaneously, said armature support inner edge is radially confined by, but can turn upon, said hub bearing surface within the limits allowed by said elastomeric material to cushion the shock of engagement between said armature and friction disk.

2. An electromagnetic clutch assembly in combination with a fluid pumping apparatus having a central drive shaft and a powered rotor supported for free rotation about said drive shaft, said powered rotor having a generally annular friction disk coaxial to said drive shaft and facing in one axial direction relative to said pumping apparatus, said clutch assembly comprising, a central hub fixed to said drive shaft having a cylindrical bearing surface coaxial to said drive shaft, an annular shoulder fixed to said central hub adjacent said bearing surface and facing in axially the opposite direction from, and radially and axially spaced relative to, said friction disk, a generally annular armature support disk comprised of a material that is radially and torsionally stiff, but axially flexible, said armature support having a radially inner ring sized to fit radially closely over said hub bearing surface and in abutment with said hub shoulder, said armature support disk also having a series of evenly spaced radial spokes joining said inner ring to said support disk and also having an outer face facing away from said friction disk and an oppositely directed inner face, a generally annular armature fixed to said armature support and axially spaced from said friction disk by a predetermined gap when said armature support is in an unflexed state and frictionally engageable with said friction disk when pulled electromagnetically theretoward, and, a torsionally flexible, resilient elastomeric material molded to both faces of said armature support disk inner edge, around said spokes, and to said central hub so as to axially capture said armature support inner ring in abutment with said central hub shoulder while allowing free rotation of said armature support disk inner ring upon said central hub bearing surface within the limits of said elastomeric material's torsional flexibility, whereby, when said armature is pulled axially into engagement with said friction disk, said armature support disk may flex inwardly about said radial spokes and axially captured inner ring while, simultaneously, said armature support inner ring is radially confined by, but can turn upon, said hub bearing surface within the limits allowed by said elastomeric material to cushion the shock of engagement between said armature and friction disk.

3. An electromagnetic clutch assembly in combination with a fluid pumping apparatus having a central drive shaft and a powered rotor supported for free rotation about said drive shaft, said powered rotor having a generally annular friction disk coaxial to said drive shaft and facing in one axial direction relative to said pumping apparatus, said clutch assembly comprising, a central hub fixed to said drive shaft having a cylindrical bearing surface coaxial to said drive shaft, a stop member fixed to said central hub adjacent said bearing surface and facing in axially the opposite direction from, and radially and axially spaced relative to, said friction disk, a generally annular armature support disk comprised of a moldable, insulative plastic material that is radially and torsionally stiff, but axially flexible, said armature support having a radially inner edge sized to fit radially closely over said hub bearing surface axially between said hub stop member and said friction disk, said armature support having an outer face facing away from said friction disk and in axial abutment with said hub stop member and an oppositely directed inner face, a series of concentric armature rings molded into said armature support disk and axially spaced from said friction disk by a predetermined gap when said armature support is in an unflexed state and frictionally engageable with said friction disk when pulled electromagnetically theretoward, and, a torsionally flexible, resilient elastomeric material molded to both faces of said armature support disk inner edge and to said central hub so as to axially capture said armature support inner edge in abutment with said central hub stop member while allowing free rotation of said armature support disk inner edge upon said central hub bearing surface within the limits of said elastomeric material's torsional flexibility, whereby, when said armature rings are pulled axially into engagement with said friction disk, said armature support disk may flex inwardly about said axially captured inner edge while, simultaneously, said armature support inner edge is radially confined by, but can turn upon, said hub bearing surface within the limits allowed by said elastomeric material to cushion the shock of engagement of said armature rings and friction disk.

* * * * *